UNITED STATES PATENT OFFICE.

DONALD K. TRESSLER, OF PITTSBURGH, PENNSYLVANIA, ASSIGNOR TO WILLIAM A. HAMOR, OF PITTSBURGH, PENNSYLVANIA.

MANUFACTURE OF LIQUID GLUE.

1,394,653.  Specification of Letters Patent.  Patented Oct. 25, 1921.

No Drawing.  Application filed December 6, 1920. Serial No. 428,482.

*To all whom it may concern:*

Be it known that I, DONALD K. TRESSLER, a citizen of the United States, residing at Pittsburgh, in the county of Allegheny, State of Pennsylvania, have invented certain new and useful Improvements in the Manufacture of Liquid Glue; and I do hereby declare the following to be a full, clear, and exact description of the invention, such as will enable others skilled in the art to which it appertains to make and use the same.

This invention relates to an improved liquid glue made from animal glues.

Ordinary animal glues, such as hide and bone glues, do not dissolve in cold water, but merely swell. They dissolve in hot water to form viscous, colloidal solutions, and are ordinarily used as adhesives in this form, i. e., in the form of hot aqueous solutions. When these hot solutions cool much below 100° F., they gelatinize and form tough jellies. Ordinary animal glues, therefore, are not adapted for use with cold water, or when their solutions in hot water are cooled to ordinary temperatures.

It has been known for some time that the presence of relatively large amounts of various substances in glue solutions prevent the formation of tough jellies when the glue solutions are cooled, and it has been proposed to prepare liquid glues by adding such substances to hot glue solutions; but liquid glues so prepared have not, so far as I am aware, proven satisfactory, due to instability, diminution of adhesiveness with age, weakening, on humid days, of glued joints made with such glues, etc. Certain of the substances which it has been proposed to add to glue solutions to prevent the formation of jellies are also prohibitive in price or impart an offensive odor or poisonous properties to the glue or destroy its stability and strong adhesive properties. Among the substances which it has thus been proposed to incorporate with hard glue solutions in order to make liquid glue, is sodium salicylate, but the resulting glue has the objection, among others, that joints made with it will weaken in damp weather.

As the result of an extended and diligent investigation of the action of a large number of substances on glue solutions, I have found that a new liquid glue having remarkable properties, and free from objections of the character above referred to, can be prepared by compounding an alkaline earth salicylate with hot solutions of ordinary bone or hide glue. I have found that glue solutions containing upward of about ten per cent. of an alkaline earth salicylate do not gelatinize when cooled to ordinary room temperatures and are powerful adhesives, possessing remarkable properties.

Among the properties and advantages characteristic of the new liquid glue of the present invention may be mentioned the following:—It will remain liquid at ordinary temperatures for an indefinite period if kept in a tightly sealed container; it may be kept practically indefinitely without danger of bacterial decomposition, owing to the powerful antiseptic properties of the alkaline earth salicylate; it has superior drying properties, and sets quickly and dries readily to form a clear transparent film possessing great strength and tenacity; it has powerful adhesive qualities and joints made with it retain substantially their full strength in humid weather; it adheres firmly to glass, wood and metal, and can be used to advantage for making joints of any of these materials; it can be used for the making of half-tone copper plates for photo engraving work; it can be dried and ground and the resulting dry glue re-dissolved in water at ordinary temperatures, in which it is completely soluble; it can be thinned with cold water if it becomes too thick, and can be diluted with water to practically any desired dilution without the formation of a jelly.

The salicylate which I have found particularly advantageous for use in making the new liquid glue is magnesium salicylate. Other alkaline earth salicylates can, however, be used, particularly strontium salicylate or calcium salicylate, although I regard the use of these latter salicylates as less advantageous. Owing to the powerful antiseptic properties of these salicylates, they impart improved keeping qualities to the glue and prevent danger of bacterial decomposition. The liquid glue can be further protected against the growth of molds on its surface by adding a small amount of a suitable material, for example, about one part of artificial oil of camphor or an equal amount of some other essential oil dissolved in an equal volume of denatured alcohol to each 1000 parts of liquid glue.

The proportions of the ingredients are capable of considerable variation, and good results still obtained.

The invention will be further illustrated by the following specific examples of different methods of producing the new liquid glue:

I make a solution of magnesium salicylate in hot water containing about 20% magnesium salicylate. I then add finely ground bone or hide glue while the solution is stirred, using about one-half part of high grade hide glue for each part of solution, or about one part of bone glue for each part of solution. When the hard glue is entirely dissolved in the solution, I cool the liquid glue down to room temperature.

As an alternative procedure, I may proceed as follows:—I prepare a solution of hide or bone glue in hot water using about one-half part of high grade hide glue to each part of water or about one part of bone glue to each part of water. When the hard glue is nearly in solution, I add about one part by weight of magnesium salicylate for each five parts of water used and continue the stirring until all of the materials are in solution.

Instead of making the new liquid glue from previously prepared hard glue, I may make it directly from the hide or bone stock with but little change in the customary procedure used in the manufacture of hard glue. The glue liquor may be prepared by the extraction of the hide or bone stock in the usual way. Hide glue liquor is evaporated until it contains about 40% of glue. Bone glue liquor is evaporated until it contains about 50% of glue. I then add about 12 parts of magnesium salicylate to each 100 parts of the glue solution and stir until the salicylate is entirely dissolved.

In the specific procedures above described the process of manufacture is carried out with the use of hot glue solutions, and such methods of procedure are more advantageous and are particularly to be recommended for purposes of commercial manufacture. The improved liquid glue composition can, nevertheless, be made, although less advantageously, if the several ingredients are mixed together in the cold with more or less stirring, and for a sufficient length of time. If a ground glue is employed, the process will ordinarily require several hours, for example, six or eight hours, while if flake glue or glue in large lumps is used, a much longer time may be necessary. Owing to the long period of time required for producing the liquid glue composition with the use of cold water, this method is less economical, and I regard the methods of manufacture which make use of hot water as the preferred and more advantageous methods of procedure.

The resulting liquid glue, produced as above described, has the desirable properties above mentioned, and is available for use where a liquid glue possessing these properties is desired. If clear, hard glues are used in its manufacture, the resulting liquid glue will be transparent and suitable for use, for example, in the preparation of copper half-tone photo engraving plates, as a very excellent enamel is formed when a thin film of this glue is carefully heated.

As above mentioned, the liquid glue is capable of dilution with cold water, if its consistency is too thick, while the glue can be dried and ground and thus prepared in a comminuted state for shipment, etc., and the dry powder can be readily dissolved in cold water, whereas the original animal glue from which it is produced is insoluble in cold water.

It will thus be seen that the new liquid glue forms a valuable adhesive and possesses properties which make it of particular value for use in the household and for other purposes.

I claim:

1. A liquid glue, comprising glue compounded with an alkaline earth salicylate.

2. A glue composition soluble in cold water and containing animal glue and an alkaline earth salicylate.

3. A liquid glue comprising a solution of animal glue and an alkaline earth salicylate.

4. A liquid glue, comprising glue compounded with magnesium salicylate.

5. A glue composition soluble in cold water and containing animal glue and magnesium salicylate.

6. A liquid glue comprising a solution of animal glue and magnesium salicylate.

In testimony whereof I affix my signature.

DONALD K. TRESSLER.